United States Patent [19]

Ward et al.

[11] Patent Number: 5,939,347
[45] Date of Patent: *Aug. 17, 1999

[54] SUPPORTED CATALYTIC ACTIVATOR

[75] Inventors: David George Ward, Laurel; Edmund Malott Carnahan, Columbia, both of Md.

[73] Assignee: W.R. Grace & Co. -Conn., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/544,051

[22] Filed: Oct. 17, 1995

Related U.S. Application Data

[63] Continuation-in-part of application No. 08/378,202, Jan. 25, 1995, abandoned.

[51] Int. Cl.⁶ .................................................. C08F 4/16
[52] U.S. Cl. ........................ 502/104; 502/152; 502/153; 502/202; 502/233; 526/129; 526/130; 526/160; 526/170; 526/943
[58] Field of Search ...................................... 526/129, 130, 526/160, 170, 901; 502/152, 153, 233, 202, 104

[56] References Cited

U.S. PATENT DOCUMENTS

| | | | |
|---|---|---|---|
| 5,057,475 | 10/1991 | Canich et al. | 502/104 |
| 5,096,867 | 3/1992 | Canich et al. | 502/103 |
| 5,198,401 | 3/1993 | Turner et al. | 502/155 |
| 5,202,398 | 4/1993 | Antberg et al. | 526/129 |
| 5,241,025 | 8/1993 | Hlatky et al. | 526/129 |
| 5,276,199 | 1/1994 | Lee et al. | 568/350 |
| 5,643,847 | 7/1997 | Walzer, Jr. | 502/117 |

FOREIGN PATENT DOCUMENTS

| | | |
|---|---|---|
| 1312992 | 1/1993 | Canada . |
| 0586167 | 3/1994 | European Pat. Off. . |
| 9109882 | 7/1991 | WIPO . |
| 9201006 | 1/1992 | WIPO . |
| 9212162 | 7/1992 | WIPO . |
| 9311172 | 6/1993 | WIPO . |
| 9403506 | 2/1994 | WIPO . |
| 9515815 | 6/1995 | WIPO . |
| 9604319 | 2/1996 | WIPO . |
| 9628480 | 9/1996 | WIPO . |

OTHER PUBLICATIONS

Makromolekulare Chemie: Macromolecular Symposia, vol. 66, No. 1297b, Feb. 1993, Basel, pp. 215–224, XP000360504 Siedle: "The Role of Non–coordinating Anions in Homogeneous Olefin Polymerization" See p. 221, paragraph 3.

Strauss, S. H., "The Search for Larger and More Weakly Coordinating Anions," Chem. Rev. 1993, 93, 927–942.

Chao–Hau Chu et al., "A New Approach for the Preparation of a Hydride–Modified Substrate Used as an Intermediate in the Synthesis of Surface–Bonded Materials," Anal. Chem. 1993, 65, 808–816.

Pesek, Joseph J., et al., "Synthesis and Spectrometric Characterization of a True Diol," Journal of Chromatograph A. 687 (1994) 33–41.

Ciardelli, Francesco, et al., "Synthesis and Structure of Metal Complexes with Organic Polymers or Inorganic Support," Macromol. Symp. 80, 29–44 (1994).

Jutzi, P. et al., "funktionalistierte Silicumverbindungen mit w–Tetramethyl– und w–Pentamethylcyclopentadienylalkyl–Liganden: Molekulare Bausteine zur Darstellung von Metall–Haltigen Polymeren," Journal of Organometallic Chemistry, 472 (1994) 27–38.

Soltfeldt–Elligsen, Dag, et al., "Heterogenization of Homogeneous Catalyst I. Epr. Study of (n–C5H5)2TiCl2/ (C2H5)nAlCl3–n(n=1,2,3) Support on Silica Gel," Journal of Molecular Catalysis, 9 (1980) 423–434.

Ofunne, G. C., et al., "Characterization and Polymerization Studies on Silica–Supported Titanium (IV) Complexes)," Indian Journal of Chemistry, vol. 27A, Dec. 1988, pp. 1040–1046.

Soga, Kazuo, et al., "Highly Isospecific Si02–Supported zirconocene Catalyst Activated by Ordinary Alkylaluminum," Macromol. Rapid Commun. 15, 139–143 (1994).

Jackson, R., et al., "Silica–Supported Analogues of Titanocene," Journal of Organometallic Chemistry, 125 (1977) 57–62.

Wild, F. R. W. P., et al., "Supported Cyclopentadienylmetal Carbonyl Complexes Silica–Gel–Supported Iron and Cobalt Derivatives," Journal of Organometallic Chemistry, 148 (1978) 73–80.

Khatib, I. S., et al., "Isoluble Ligands and Their Applications," Journal of Organometallic Chemistry, 369 (1989) 9–16.

Booth, B. L., et al., "Silica–Supported Cyclopentadienyl––Rhodium (I),—Cobalt (I), and –Titanium (IV) Complexes," Journal of Organmetallic Chemistry, 315 (1986) 143–156.

*Primary Examiner*—David W. Wu
*Attorney, Agent, or Firm*—Robert A. Maggio

[57] ABSTRACT

A supported polyolefin catalyst activator, comprising a four coordinate anion having a direct chemical bond to a catalyst carrier, wherein said anion is comprised of a neutral, three coordinate compound, $MR_3$, and a carrier having oxygen containing functionalities, wherein M is selected from the group comprising boron, tellurium, aluminum, gallium, indium and mixtures thereof, and R's can be the same or different and are selected from the group comprising alkyls, alkoxys, alkenyls, halogen substituted alkyls, alkoxys, and alkenyls, aryls, aryl halides, halides and mixtures thereof; and a cation counter ion to said anion, wherein said cation is a protonated base or a Lewis Acid capable of protonating or abstracting a moiety, such as an alkyl or aryl, from a transition metal containing catalyst precursor resulting in a cationic transition metal species.

7 Claims, 1 Drawing Sheet

SUPPORTED CATALYTIC ACTIVATOR

This application is a continuation-in-part of U.S. Ser. No. 08/378,202, filed Jan. 25, 1995 now abandoned.

FIELD OF INVENTION

The invention relates to catalyst activator compositions, to a method for preparing such catalyst activator compositions, to a method of using such catalyst activator and to polymer products produced with such catalyst compositions using the present activator. More particularly, this invention relates to compositions, comprising supported ionic catalyst activator compositions useful to activate polyolefin catalysts to polymerize olefins, diolefins and/or acetylenically unsaturated monomers to homopolymer, copolymer and terpolymer products.

BACKGROUND OF THE INVENTION

Ziegler-Natta (Z-N) and metallocene-alumoxane type catalyst systems for the polymerization of olefins are well known in the art. Recently a new, ionic pair type of catalyst has been developed which yields polymers of improved properties compared to those made with conventional catalyst systems.

These systems typically use Group IV-B metallocene catalysts prepared as a reaction product of a Group IV-B metal metallocene compound and an ionic activator compound. U.S. Pat. No. 5,241,025 teaches the use of a catalyst system comprising a Group III-A element compound comprising a cation capable of donating a proton which will irreversibly react with at least one ligand contained in the Group IV-B metal compound and an anion which is bulky, labile and non-coordinatable with the Group IV transition metal cation produced upon the reaction of the metallocene and activator compound. Similarly, U.S. Pat. No. 5,198,401 teaches that ionic catalyst compositions can be prepared by combining two components, bis(cyclopentadieny) Group IV-B metal complex containing at least one ligand which will combine irreversibly with the second component or at least a portion thereof such as a cation portion thereof. The combination of the two components produces an ionic catalyst composition comprising a cationic bis(cyclopentadienyl) Group IV-B metal complex which has a formal coordination number 3 and a 4+ valence charge and the aforementioned non-coordinating anion. Both of these U.S. patents are directed to homogenous metallocene polyolefin catalyst systems. Use of these catalyst systems in other reactor designs, particularly slurry reactors, can result in reactor fouling, poor productivities, poor polymer bulk densities, and poor polymer particle morphologies. For these reasons, it is desirable to develop heterogeneous versions of these ion pair cocatalysts, where the cocatalyst is deposited on a carrier, preferably an oxide such as silica or alumina.

An example of a supported ion pair catalyst system is taught in WO 94/03506, wherein a support which had been modified with an alkyl aluminum reagent is treated with a solution of a metallocene catalyst and an anionic activator, and the solvent is removed. The resulting catalyst system provided a low activity heterogeneous ion pair catalyst system. Because there is no direct chemical bond between the catalyst ion pair and the support, resolubilization of the catalyst may make this system unsuitable for slurry reactors.

WO 93/11172 discloses the use of certain polyanionic transition metal catalyst compositions wherein the polyanionic moiety comprises a plurality of metal or metalloid atoms—containing non-coordinating anionic groups pendant from and chemically bonded to a core component through use of a carbon containing a spacer between the metal or metalloid atoms and the core component. However, WO 93/11172 teaches to avoid exposing its activator to high concentrations of functionalities which are known poison for metallocene polymerization catalysts and in fact, teaches the necessity of masking reactive functionalities on a support, such as hydroxyl-groups on silica.

The present invention overcomes the above mentioned problems and provides further improvements to catalytic systems by providing a catalyst activator chemically bound directly to the support, reducing resolubilization of heterogenous catalysts and therefore minimizing reactor fouling. Furthermore, the present invention further permits the use of supports having high concentrations of chemical functionalities that would otherwise act as poisons to metallocene catalysts.

In addition, the direct bond between the support and the catalyst activator provides a large support effect, allowing properties of the activator to be altered by modifying the support and consequently, permitting the support to influence the polymer morphology.

Furthermore, catalyst systems containing the present activator produce a high bulk density polyethylene. The high bulk products cost less to ship to end users, flow better in molding operations and eliminates the need to pelletize what would otherwise have been a resin fluff.

Additionally, multi-modal polyolefin resins may be prepared using the supported catalytic activator of the present invention with a mixture of catalysts, including chromium, Ziegler-Natta and metallocene catalysts.

SUMMARY OF THE INVENTION

The present invention meets the above objectives by providing an improved supported catalyst activator. The invention further provides unique catalyst activator compositions suitable for use with multiple catalysts, permitting the support to influence polymer morphology and reducing fouling of polymerization equipment.

The present invention is directed to a supported catalyst activator comprising a four coordinate anion species having a direct chemical bond to a catalyst carrier wherein said anion species is comprised of a neutral three coordinate compound, $MR_3$, and a support having oxygen containing functionalities, wherein the M is selected from the group consisting of boron, tellurium, aluminum, gallium and indium and mixtures thereof and the R's may be identical or different and are selected from the group consisting of alkyls, halogen substituted alkyls, aryls, arylhalides, alkenyls, alkoxy and halides and mixtures thereof; and a cation to this anion wherein said cation is a protonated base or a Lewis Acid, including hydrogen cation, capable of protonating or abstracting a moiety, such as an alkyl, aryl, or halogen moiety, from a transition metal containing catalyst precursor resulting in a cationic transition metal species.

The invention further includes methods of producing the supported catalyst activator and the polymers produced from polymerizing monomers in contact with the resulting catalyst system incorporating the activator of the present invention.

DETAILED DESCRIPTION OF THE INVENTION

The present invention is directed to a supported catalyst activator comprising an anion species having a direct chemical bond to a catalyst support having oxygen containing functionalities; wherein said anion species having the general formula $MR_3$ wherein the M is selected from the group consisting of boron, tellurium, aluminum, gallium and indium and mixtures thereof and the R's are independent and selected from the group consisting of alkyls, alkenyls, halogen substituted alkyls, aryls, arylhalides, alkoxy and halides and may be the same or different; and a cation to this anion wherein said cation is a protonated base or a Lewis Acid, including hydrogen cation, capable of protonating or abstracting a moiety, such as an alkyl, aryl, halogen from a transition metal containing catalyst precursor resulting in a transition metal cation.

One possible structure for this type of species is shown below.

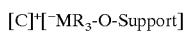

Where, $[C]^+$ is an activating cation, which may be a Bronsted acid capable of donating a proton to the transition metal catalytic precursor resulting in a transition metal cation. Such Bronsted acids include but are not limited to ammoniums, oxoniums, phosphoniums and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N,-dimethylaniline, p-nitro-N,N-dimethylaniline; phosphoniums from triethylphosphine, triphenylphosphine and diphenylphosphine; oxoniums from ethers such as dimethyl ether, diethyl ether, tetrahydrofuran and dioxane; sulfoniums from thioethers such as diethyl thioethers and tetrahydrothiophene; and mixtures of the foregoing; most preferably dimethylanilinium.

Furthermore, $[C^+]$ may be an abstracting moiety that is capable of reacting with a transition metal catalytic precursor resulting in the transition metal cation. Acceptable abstracting moiety include but are not limited to silver, carboniums, tropylium, carbeniums, ferroceniums and mixtures thereof; preferably carboniums and ferroceniums and mixtures thereof; and most preferably triphenyl carbonium. The $[C^+]$ may also include mixtures of the Bronsted acids and the abstracting moiety species as described herein.

R can be the same or independent and are selected from the group comprising halogen (including chlorine, bromine, fluorine, iodine and mixtures thereof, preferably chlorine and fluorine), mono or multi-cyclic (including halosubstituted) aryls, alkyls, and alkenyl compounds and mixtures thereof; preferred are C1–C20 alkenyl groups (such as ethenyl, propylenyl, butenyl, and pentenyl); C1–C20 alkyl groups (such as a methyl, ethyl, n-propyl, iso-propyl, n-butyl, n-octyl, and 2-ethylhexyl groups), C6–20 aryl group (including substituted aryls) (such as phenyl, p-tolyl, benzyl, 4-t-butylphenyl, pentaflurophenyl, 2,6 dimethylphenyl, 3,5- methylphenyl, 2,4-dimethylphenyl, 2,3-dimethylphenyl, pentafluorobenzyl groups); C1–C20 alkoxy (such as ethoxy, butoxy, t-butoxy, n-butoxy) and mixtures thereof. More preferred R groups are C1–C5 alkyls, phenyl and napthyl and mixtures thereof.

M is selected from the group comprising boron, aluminum, gallium, indium, tellurium and mixtures thereof; O is oxygen; and Support is a carrier or support defined as inorganic carriers, inorganic oxide carriers, and organic carriers. Of these, inorganic carriers and inorganic oxide carriers are particularly preferably.

Inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof such as silica alumina, silica alumina titania, zeolite, ferrite and [glass fibers, any O]. In addition, the above-mentioned inorganic oxide carriers may contain a small amount of carbonates, nitrates, sulfides or the like.

Additional carrier materials include aluminum phosphate gel materials as well as polymeric or organic supports containing reactive functionalities such as polyvinylalcohol, poly(methylmethacrylate) and hydroxy substituted polystyrene and mixtures of two or more of the foregoing.

Preferred carrier materials are silica or alumina based materials such as oxide of silica, and oxides of Si—Al, Si—Ti, Si—Al—Ti, $SiMgCl_2$, and aluminum phosphate gel materials and mixtures thereof; and most preferred materials are silica, Si—Al, Si—Ti, Si—Al—Ti, and SiMgCl2 materials and mixtures thereof.

The carriers suitable for this invention can be, but need not be calcined before use.

Preferably, the carriers are compositions conventionally used as a catalyst support material. The degree of porosity in the carrier may be any level that is achievable in the starting material. Preferably, the carrier particles of the present invention have a pore volume of at least 0.3 cc/g; preferably from 0.3 to 5 cc/g; more preferably from 0.3 to 3 cc/g; and most preferably, the pore volume exceeds 1 cc/g. Preferably, the carrier particles have a surface area of about 1–1000 $m^2/g$; preferably from 200–800 $m^2/g$ ; and most preferably from 250 to 650 $m^2/g$. The typical particle size for a suitable carrier for this invention is from 1 to 300 microns, preferably from 10 to 200 microns, more preferably from 20 to 100 microns.

Pore volume and surface area can be, for example, measured from volume of nitrogen gas adsorbed in accordance with BET method. (Refer to J. Am. Chem. Soc., vol. 60, p. 309 (1983)).

In the preferred embodiments of the present invention, the M is boron, aluminum or mixtures thereof, the support is calcined silica, the R is selected from the group comprising halosubstituted and non-substituted C1–C5 alkyls and C6–C18 aryls and mixtures thereof, and the cation is either an alkyl substituted ammonium salt or mixtures thereof; and preferably are dimethylanilinium, triphenylmethane cation and mixtures thereof.

In a preferred embodiment, the composition is a borate-modified support formed by the interaction of 1) a carrier, having a hydroxyl functionality including but not limited to silicas and aluminas; 2) a three coordinate boron or aluminum species; 3) a base; and 4) a cation that can serve to abstract an alkyl ligand from a metallocene alkyl.

Components 3) and 4) may result from the same chemical or a combination of two or more chemicals. The resulting modified support contains a four-coordinate anionic species with a direct chemical bond to the support.

Examples of the boron species suitable for use in this invention include but are not limited to tri(phenyl)boron, tri (p-tolyl) boron, tri(o-tolyl) boron, tri(pentafluorophenyl) boron, tri(o,p-dimethylphenyl)boron, tri(m,m-di (trifluoromethyl) phenyl)boron, tri(p-trifluoromethylphenyl) boron, and the like; and mixtures of the foregoing.

Examples of the aluminum species suitable for use in this invention include but are not limited to tri(phenyl) aluminum, tri(p-tolyl)aluminum, tri(o-tolyl)aluminum, tri (pentafluorophenyl)aluminum, tri(o,p-dimethylphenyl) aluminum, tri(m,m-di(trifluoromethyl)phenyl)aluminum, tri (p-trifluoromethylphenyl) aluminum, and the like; and mixtures of the foregoing.

Examples of suitable bases for use in this invention is any base capable of deprotonating the carriers, and include, but are not limited to, the following species: metal hydroxides, metal alkyls and aryls, trialkyl-substituted amines such a triethylamine, tripropylamine, tri(n-butyl)amime, trimethylamine, and the like; N,N-dialkyl anilines such as N,N-dimethylaniline, N,N,-diethylaniline, N,N,-2,4,6-pentamethylaniline and the like; dialkyl amines such as di-(isopropyl)amine, dicyclohexylamine and the like; triaryl phosphines such as tri(methylphenyl)phosphine and tri (dimethylphenyl)phosphine and the like; and mixtures of the foregoing.

One method for preparing the present composition comprises:

1) treating a catalyst support having the potential for nucleophilic-oxygen sites, in an organic solvent, with a C1–C20 metal alkyl, C6–C20 metal aryl, substituted C1–C20 metal alkyls and C6–C20 metal aryls and mixtures thereof; wherein the metal in this reagent is selected from the group comprising Group 1 and 2 metals from the Periodic Table and mixtures thereof; preferably N-butyllithium, dibutylmagnesium, methyllithium, butylmagnesium chloride and mixtures thereof, which can react with the support surface to generate nucleophilic oxygen sites, and 2) adding a neutral, three coordinate metal component $MR_3$ as defined above, and 3) adding an organic compound, which reacts with the product metal component from step 2. Suitable organic compounds include those of the general formula R'X, capable of reacting to form a cation, which in turn reacts with the transition metal catalyst precursor. The R' is selected from the group comprising hydrogen, and halosubstituted and nonsubstituted alkenyl, alkyl, aryl, or arylalkyl radicals having from 1–20 carbon atoms or two carbon atoms joined together to form a part of C4 to C6 ring. X is any halogen, preferrably chlorine or bromine. A suitable organic compound includes pronated amides and ammonium salts as well. Preferred organic compounds are a halogen containing compound such as chlorotriphenylmethane, dimethylanilinium chloride, and mixtures of the foregoing.

The reagents are used in quantities that can be expressed in terms of mmol of reagent to gram of support. In steps 1), 2) and 3) the mmol of the added reagent (i.e., the metal alkyl and aryls, $MR_3$, and the organic compound respectively) are used in an amount ranging from 0.01–10.00 mmole:gram of support, preferably 0.10–1.0 mmol/gram, and more preferrably 0.5 mmol:gram of support. Preferrably the amount of the reagents used in steps 2) and 3) are equal to or exceed that amount of reagent used in step 1).

Another method for preparing the present invention comprises the following steps which can be carried in any order:

1) treating a catalyst support, preferably in an organic solvent with an organic base in solution, preferably of the formula $R_3N$ wherein N is nitrogen, and the R's are independently selected from the group comprising hydrogen, C1–C20 alkyl(preferably C3–C9), C6–C20 aryls (preferably C8–C14, substituted C1–20 alkyls (preferably C3–C9) and C6–C20 aryls (preferably C8–C14), and may be the same or different; preferred amines are as dimethylaniline, tributylamine, triethylamine, and mixtures thereof, and 2) adding a neutral material, $MR_3$, as defined above, The reagents are used in quantities that can be expressed in terms of mmol of reagent to gram of support. In steps 1) and 2) the mmol of the added reagent (i.e., the organic base and $MR_3$, respectively) are used in an amount ranging from 0.01–10.00 mmole:gram of support, preferably 0.10–1.0 mmol/gram, and more preferrably 0.5 mmol:gram of support. Preferrably the amount of the reagent used in step 2) is equal to or exceed that amount of reagent used in step 1).

Suitable organic solvents for either of these methods include but are not limited to non-polar organic solvents. Most preferably includes aliphatic hydrocarbons (typically C3 to C12, such as butane, isobutane, pentane, isopentane, hexane, octane, decane, dodecane, hexadecane, octadecane, and the like); alicyclic hydrocarbons (typically C5–C20, such as cyclopentane, methylcyclopentane, cyclohexane, decalin cycloctane, norbornane, ethylcyclohexane and the like); aromatic hydrocarbons, including substituted aromatics such as benzene, chlorobenzene, xylene, toluene and the like; and petroleum fractions such as gasoline, kerosene, light oils, and the like. It may also be desirable to use tetrahydrofuran or another ether. Mixtures of two or more solvents may also be used, e.g., Exxon's IsoPar®.

Either of these methods further includes the step of removing the solvent from the reaction product by any number of usual techniques, including evaporative and filtering techniques.

Preferred Catalytic Precursors

The active olefin polymerization catalyst is formed by the interaction of the present supported catalytic activator with the transition metal catalyst precursor.

Such transition metal catalyst precursor compounds of the Group IV V, VI metal hydrocarbyloxides as described in WO 92/01006, metallocenes as defined herein, Group IV and other metal monocyclopentadienyl-heteroatom ligand compounds as described in U.S. Pat. Nos. 5,005,438; 5,096,867; 5,057,475; and WO 92/12162.

The catalyst activator of the present invention is suitable for use with any polyolefin catalyst system, most preferably metallocene systems, but may also be useful in mixed Ziegler-Natta/Metallocene systems which may optionally include one or more chromium catalysts.

As used herein metallocene is defined as organometallic compounds having a transition metal, including rare earth metals, in coordination with members of at least one five-member carbon ring, heterosubstituted five-member carbon ring, or a bridged (ansa) ligand defined as multi cyclic moieties capable of coordinating to the transition or rare earth metals.

The ansa bridge can be selected from the group comprising carbon, silicon, phosphorus, sulfur, oxygen, nitrogen, germanium, species such as R2C, R2Si, R2Ge, $R^3_2CR^3_2C$, $R^3_2SiR^3_2Si$, $R^3_2GeR^3_2Ge$, $R^3_2CR^3_2Si$, $R^3_2CR^3_2Ge$, $R^3_2CR^3_2CR^3_2C$, $R^3_2SiR^3_2Si$ diradicals where $R^3$ is independently selected from the group containing hydride, halogen radicals, and C1–20 hydrocarbyl radicals including ethyl and propyl; preferred ansa bridges are $Me_2Si$ (dimethylsilyl), $Ph_2Si$ (diphenylsilyl), $Me_2C$ (isopropylidene), $Ph_2P$ (diphenylphosphoryl) $Me_2SiSiMe_2$ (tetramethyldisilane) and the like. Preferably, the ansa bridge has a length of two atoms or less as in methylene, ethylene, diphenysilyl, dimethylsilyl, propylidene and methylphenylsilyl.

The transition metal component of the metallocene is selected from Groups 3 through Group 10, 13–17 of the Periodic Table, lanthanides and actinides and mixtures thereof; preferably Group 3, 14, 15, 16 and lanthanides and actinides metals; and most preferably titanium, zirconium, hafnium, chromium, vanadium, samarium and neodymium. Of these Ti, Zr, and Hf are most preferable.

In one preferred embodiment, the metallocene catalyst is represented by the general formula $(Cp)_m MR^4_n R^5_p$, wherein Cp is a substituted or unsubstituted cyclopentadienyl ring, M is a Group 4, 14, 5, 15, 6 and 16 transition metal; $R^4$ and $R^5$ are independently selected halogen, hydrocarbyl group, or hydrocarboxyl groups having 1–20 carbon atoms; m=1–3, p=0–3 and the sum of m+n+p equals the oxidation state of M.

In another embodiment the metallocene catalyst is represented by the formulas:

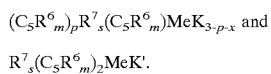

$R^7_s(C_5R^6_m)_2 MeK'$.

Wherein Me is a Group 4, 14, 5, 15, 6 or 16 transition metal; $C_5R^6_m$ is a substituted cyclopentadienyl each $R^6$, which can be the same or different is hydrogen, alkenyl, aryl, or arylalkyl radical having from 1 to 20 carbon atoms or two carbon atoms joined together to form a part of a C4 to C6 ring; $R^7$ is one or more of or a combination of a carbon, a germanium, a silicon, a phosphorous or a nitrogen atom containing radical substitution on and bridging two $C_5R^6_m$ rings or bridging one $C_5R^6_m$ ring back to Me, when p=0 and x=1 otherwise x is always equal to 0, each K which can be the same or different is an aryl alkyl, alkenyl, alkaryl, or arylalkyl radical having from 1–20 carbon atoms or halogen, K' is an alkylidene radical having from 1 to 20 carbon atoms, s is 0 to 1 and when s is 0, m is 5 and p is 0, 1, or 2 and when s is 1, m is 4 and p is 1.

The transition metal component of the metallocene is selected from Groups 3 through Group 10, 13 through 17 and lanthanides and acticnides of the Periodic Table and mixtures thereof, preferably Group 3, 4, 5, 6 and lanthanides and actinides metals, and most preferably titanium, zirconium, hafnium, chromium, vanadium, samarium and neodymium. Of these Ti, Zr, and Hf are most preferable.

In particular, preferred metallocenes are derivatives of a cyclopentadiene (Cp), including cyclopentadienyl, indenyl, fluorenyl, tetrahydroindenyl, and 1,1-disubstituted silacyclopentadienes, phosphocyclopentadienes, 1-metallocyclopenta-2,4-dienes, bis(indenyl)ethane and mixtures thereof.

Additional illustrative but non-limiting examples of metallocenes represented by the above definition are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl) titanium=CH2 and derivatives of this reagent; substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl (cyclopentadienyl)(fluorenyl)zirconium dichloride, isopropyl(cyclopentadienyl) (octahydrofluorenyl)zirconium dichloride diphenylmethylene(cyclopentadienyl)(fluorenyl) zirconium dichloride, diisopropylmethylene (cyclopentadienyl)(fluorenyl)zirconium dichloride, diisobutylmethylene(cyclopentadienyl)(fluorenyl) zirconium dichloride, ditertbutylmethylene (cyclopentadienyl)(fluorenyl)zirconium dichloride, cyclohexylidene (cyclopentadienyl)(fluorenyl) zirconium dichloride, diisopropylmethylene (2,5-dimethylcyclopentadienyl) (fluorenyl)zirconium dichloride, isopropyl (cyclopentadienyl)(fluorenyl) hafnium dichloride, diphenylmethylene (cyclopentadienyl) (fluorenyl)hafnium dichloride, diisopropylmethylene(cyclopentadienyl) (fluorenyl)hafnium dichloride, diisobutylmethylene (cyclopentadienyl) (fluorenyl)hafnium dichloride, ditertbutylmethylene(cyclopentadienyl) (fluorenyl)hafnium dichloride, cyclohexylidene(cyclopentadienyl)(fluorenyl) hafnium dichloride, diisopropylmethylene(2,5-dimethylcyclopentadienyl) (fluorenyl)hafnium dichloride, isopropyl(cyclopentadienyl)(fluorenyl)titanium dichloride, diphenylmethylene(cyclopentadienyl) (fluorenyl)titanium dichloride, diisopropylmethylene(cyclopentadienyl) (fluorenyl)titanium dichloride, diisobutylmethylene (cyclopentadienyl) (fluorenyl)titanium dichloride, ditertbutylmethylene(cyclopentadienyl) (fluorenyl)titanium dichloride, cyclohexylidene(cyclopentadienyl) (fluorenyl) titanium dichloride, diisopropylmethylene(2,5 fluorenyl) titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1,1,2,2-tetramethylsilanylene bis (1-indenyl) zirconium (IV) dichloride, racemic-1,1,2,2-tetramethylsilanylene bis(4,5,6,7-tetrahydro-1-indenyl) zirconium (IV), dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl (4,5,6,7-tetrahydro-1-indenyl) hafnium (IV) dichloride, racemic-1,1,2,2-tetramethylsilanylene bis (1-indenyl) hafnium(IV) dichloride, racemic-1,1,2,2-tetramethylsilanylene bis (4,5,6,7-tetrahydro-1-indenyl)

hafnium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride.

Preferred metallocenes are bis(cyclopentadienyl)titanium dimethyl, isopropyl (cyclopentadienyl) fluroenyl)zirconium dimethyl, bis (1-indenyl) zirconium (IV) dimethyl, (4,5,6,7-tetrahydro-1-indenyl)hafnium(IV)dimethyl, dimethylzirconene, dimethyethylenebisindenylzirconium, and dimethylethylene bis(tetrahydroindenyl)zirconium.

The transition metal catalyst useful in this invention can include non-cyclopentadienyl catalyst components (such as pentadienyls) as well as ancillary ligands such as borollides or carbollides in combination with a transition metal.

Transition metal catalyst also include traditional Ziegler-Natta ("ZN") catalysts precursor which are by the formula $M'^a R_a$ wherein M' is a transitional metal from the Group 3 through 10 and the Lanthanide Series in the Periodic Table, wherein "a" is its valence state and the number of R's is equal to "a" and each may be the same or different and independently selected from the group consisting of halogens(preferably Cl and Br), alkyls(preferably C1–20; more preferably ethyl, butyl, octyl and ethylhexyl), alkoxys (preferably C1–C20, more preferably ethoxy, isopropoxy, butoxy and phenoxy), aryls (preferably C6–C20(including substituted aryls), more preferably phenyl, p-tolyl, benzyl, 4-t-butylphenyl, 2,6 dimethylphenyl, 3,5- methylphenyl, 2,4-dimethylphenyl, 2,3-dimethylphenyl groups) and mixtures thereof. For example, $TiCl_4$, $TiCl_3$, $VOCl_3$, $VCl_4$, $TiPhenyl4$, $V(OButyl)3$, tetramethyl zirconium, tetrabenzylzirconium, tetramethoxyzirconium, tetraethoxyzirconium, tetrabutoxyzirconium, bis(2,5-di-t-butylphenoxy)dimethylzirconium, bis(2,5-di-t-butylphenoxy)dichlorozirconium and zirconium bis (acetylacetonate), tetramethyl titanium, tetrabenzyltitanium, tetramethoxytitanium, tetraethoxytitanium, tetrabutoxytitanium, bis(2,5-di-t-butylphenoxy) dimethyltitanium, bis(2,5-di-t-butylphenoxy) dichlorotitanium and titanium bis(acetylacetonate).

The activator of the present invention is preferably used with a metallocene catalyst precursor defined above. It is the combination of the activator and the catalyst precursor that forms the active catalyst. The amount of the present support activator used with a transition metal catalyst precursor is an amount sufficient to provide a molar ratio of the support M, as defined above from reagent $MR_3$, to the transition metal in the catalyst ranging from 1:1 to 1:5, preferably 1:1.

Polymerization

The supported catalytic activator according to the present invention can be used in any polymerization technique. Methods and apparatus for effecting such polymerizatin reactions are well known. The supported catalystic activators according to the present invention can be used in similar amounts and under similar conditions to known olefin polymerization catalysts systems.

As used herein, "Polymerization" includes copolymerization and terpolymeriztion and the terms olefins and olefinic monomer includes olefins, alphaolefins, diolefins, strained cyclic, styrenic monomers, acetylenically unsaturated monomers, cyclic olefins alone or in combination with other unsaturated monomers. While the catalyst system of the present invention is active for this broad range of olefinic monomer feedstock, alpha-olefins polymerizations is preferred, especially the homopolymerization of ethylene or the copolymerization of ethylene with olefins having 3 to 10 carbon atoms.

"Polymerization techniques" for olefin polymerization according the present invention can be solution polymerization, slurry polymerization or gas phase polymerization techniques. Method and apparatus for effecting such polymerization reactions are well known and described in, for example, Encyclopedia of Polymer Science and Engineering published by John Wiley and Sons, 1987, Volume 7, pages 480–488 and 1988, Volume 12, pages 504–541. The catalyst according to the present invention can be used in similar amounts and under similar conditions to known olefin polymerization catalyst.

Typically, for the slurry process, the temperature is from approximately 0 degrees C. to just below the temperature at which the polymer becomes swollen in the polymerization medium. For the gas phase process, the temperature is from approximately 0 degrees C. to just below the melting point of the polymer. For the solution process, the temperature is typically the temperature from which the polymer is soluble in the reaction medium up to approximately 320 degrees C.

The pressure used can be selected from a relatively wide range of suitable pressures, e.g., from subatmospheric to about 350 Mpa. Suitably, the pressure is from atmospheric to about 6.9 Mpa, or 0.05–10 MPa, especially 0.14–5.5 Mpa. Pressure is dictated by the process and the desired product. In the slurry or particle form process, the process is suitably performed with a liquid inert diluent such as a saturated aliphatic hydrocarbon. Suitably the hydrocarbon is a $C_4$ to $C_{10}$ hydrocarbon, e.g., isobutane or an aromatic hydrocarbon liquid such as benzene, toluene or xylene. The polymer is recovered directly from the gas phase process or by filtration or evaporation from the slurry process or evaporation from the solution process.

The supported activator of the present invention are particularly suited for the gas phase or slurry processes.

Figure 1:
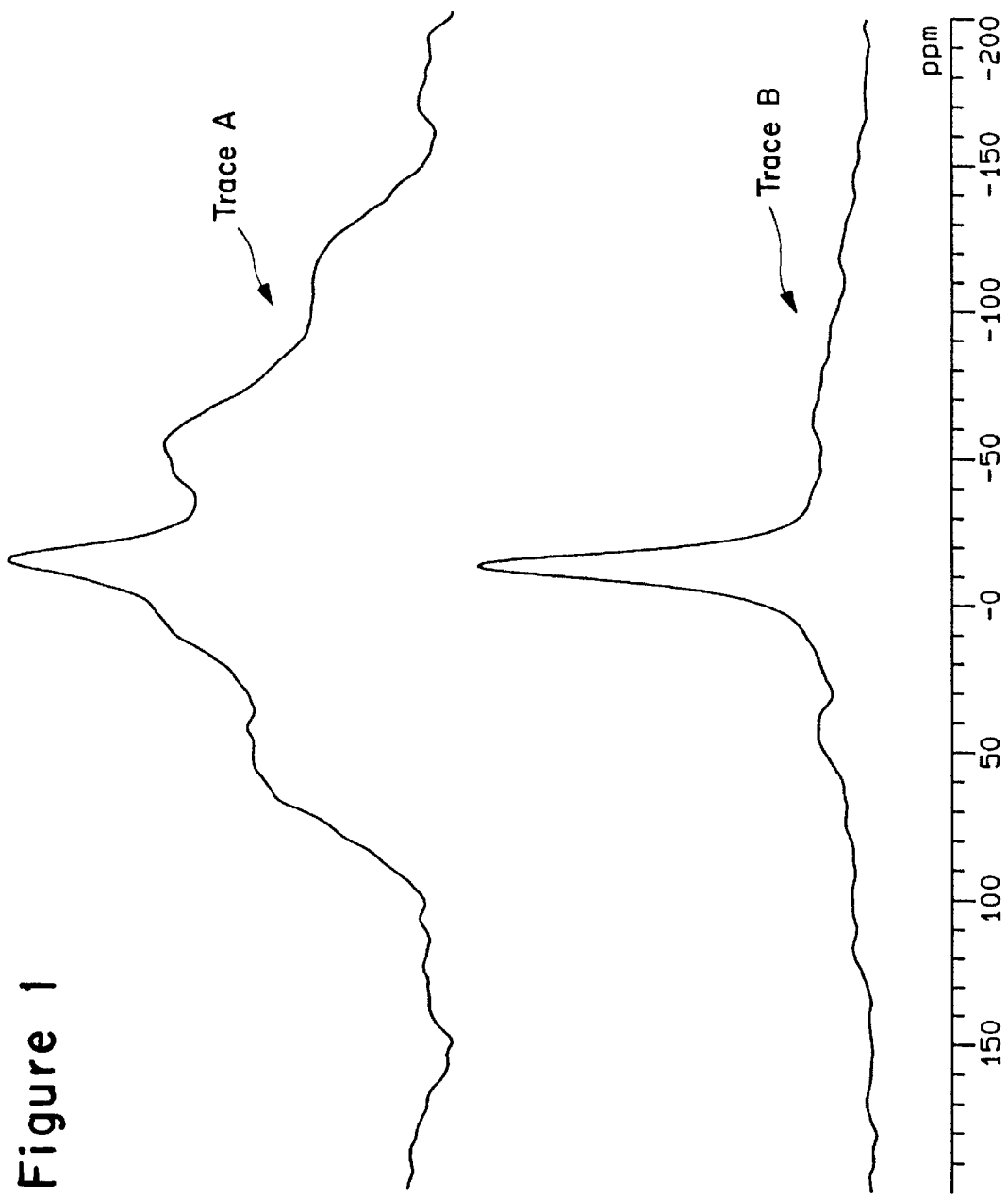
FIG. 1 is a depiction of the $^{11}B$ Magnetic angle spinning (MAS) Nuclear Magnetic Resonance (NMR) spectrum of $[B(C_6F_5)_3]$ physisorbed on a calcined amorphous silica gel (Trace A) and a depiction of the $^{11}B$ MAS NMR of a supported catalytic activator as prepared in Example 1, described below, and depicts the direct chemical bond of the $[B(C_6F_5)_3]$ to the oxygen of the amorphous silica gel(Trace B).

The sharp line pattern in Trace B is indicative of a four coordinate boron center, proving $[B(C_6F_5)_3]$ has reacted chemically with the silica to form a four coordinate borate salt.

EXAMPLES

The following examples are provided to illustrate the present invention, but are not to be constred as limiting the invention in any way except as provided in the appended claims. All parts and percentages are by weight unless otherwise indicated.

Example 1

Preparation of Supported Borate A. Davison Grade 948 silica, a 50 micron average particle size spheriodal silica gel, was calcined in air at 500° C. for 4 hours, then transferred to an argon-filled glove box. To a slurry of 5.02 g silica in 50 ml heptane was added 0.5 ml of a 2 Molar solution of "BuLi in hexane. After 30 minutes, 0.518 g of [B(C$_6$F$_5$)$_3$] was added. The mixture was stirred for 1 hour, and 0.281 g of Ph$_3$CCl was introduced. The slurry immediately turned yellow, then darkened to orange over the course of 10 minutes. After 30 minutes, the orange solid was collected on a fitted funnel, washed with toluene and pentane, and dried in vacuo. The solid was analyzed by $^{11}$B NMR, which confirmed formation of four-coordinate borate species.

Example 2

Preparation of Supported Borate B. The same procedure as reported for Borate A was followed with the following reagents: 2.640 g SRA alumina, 0.25 ml "BuLi, 0.26 g [B(C$_6$F$_5$)$_3$], and 0.141 g Ph$_3$CCl. The isolated product was a pale brown solid. The solid was analyzed by $^{11}$B NMR, which confirmed formation of four-coordinate borate species.

Example 3

Preparation of Supported Borate C. To 10.0 g Davison 948 silica in 200 ml heptane were added 10 mmol of a heptane solution of [B(C6F5)3] and 1.3 ml of dimethylaniline. The solution was heated at reflux for 4 hours, yielding a white solid and a blue filtrate. The solid was analyzed by $^{11}$B NMR, which confirmed formation of four-coordinate borate species.

Example 4

Preparation of Polyolefin Catalyst A. 0.245 g Borate A was added to a solution of 0.5 ml of a triethyl aluminum solution (5.6% Al in heptane) in 50 ml heptane. To the mixture was added 0.0020 g Cp$_2$ZrMe$_2$. The resulting mixture was heated to 45° C., and 53 psi ethylene was introduced. Polymerization yielded 3.96 g free-flowing polyethylene in 34 minutes, corresponding to an activity of 895 gPE/mmol Zr/hr.

Example 5

Preparation of Polyolefin Catalyst B. As above, except 0.150 g borate B, 0.0015 g Cp$_2$ZrMe$_2$ were employed. The catalyst yield 1.95 g polyethylene in 23 minutes, corresponding to an activity of 835 gPE/mmol Zr/hr.

Example 6

Preparation of Polyolefin Catalyst C. 1 g of Borate C was slurred in 500 ml heptane, and 1 mmol triethylaluminum was added as a heptane solution. To this mixture was added 0.01 g Cp$_2$ZrMe$_2$. Polymerization at 35 psi ethylene and 40° C. yielded 6 g polyethylene in 0.25 hr, corresponding to an activity of 290 gPE/mmolZr/Hr.

We claim:

1. A supported catalyst activator represented by the structural formula:

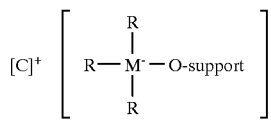

and comprising:

(a) a four coordinate anion comprised of a neutral, three coordinate compound, MR$_3$, chemically bonded through M to the oxygen of a metal oxide support selected from the group consisting of SiO$_2$, Al$_2$O$_3$, MgO, ZrO$_2$, TiO$_2$, Fe$_2$O$_3$, B$_2$O$_3$, CaO, ZnO, BaO, ThO, aluminum phosphate gel and mixtures thereof; and (b) a cation counter ion [C]$^+$ to said anion, wherein said cation is a Lewis Acid having an abstracting moiety selected from the group consisting of carbonium, tropylium, carbenium, ferrocenium and mixtures thereof, capable of abstracting an alkyl, aryl, or halogen group from a transition metal containing catalyst precursor resulting in a cationic transition metal species; and wherein M is selected from the group consisting of boron, tellurium, aluminum, gallium, indium, and mixtures thereof;

R, which is the same or different, is selected from the group consisting of (a) halogen, (b) halosubstituted or unsubstituted, cyclic or non-cyclic, alkyl, alkoxy, alkenyl, (c) halosubstituted or unsubstituted mono or multi-cyclic aryl, and (d) mixtures thereof;

[C]$^+$ represents the cation counter ion, and O-support represents the metal oxide support.

2. The supported catalyst activator of claim 1, wherein the M is boron, aluminum or mixtures thereof;

the support is selected from the group consisting of silica, silica alumina, silica alumina titania, silica magnesium chloride, silica titania, aluminum phosphate gel, and zeolite;

R, which is the same or different, is selected from the group consisting of halosubstituted and nonsubstituted C$_1$–C$_5$ alkyl, C$_6$–C$_{18}$ aryl and mixtures thereof.

3. The supported catalyst activator of claim 1 wherein the cation is triphenyl carbenium.

4. The supported catalyst activator of claim 1, wherein R, which is the same of different, is selected from the group consisting of chlorine, bromine, ethenyl, propylenyl, butenyl, pentenyl, methyl, ethyl, n-propyl, iso-propyl, n-butyl, n-octyl, 2-ethylhexyl, phenyl, p-tolyl, benzyl, 4-t-butylphenyl, 2,6 dimethylphenyl, pentaflurophenyl, 3,5-methylphenyl, 2,4-dimethylphenyl, 2,3 -dimethylphenyl, pentafluorobenzyl, napthyl, ethoxy, butoxy, t-butoxy, n-butoxy, and mixtures thereof.

5. A method for preparing a supported catalyst activator comprising a four coordinate anion and a Lewis acid cation counter ion, said method comprising:

(A) treating metal oxide catalyst support with a metal containing reagent selected from the group consisting of C$_1$–C$_{20}$ metal alkyl, C$_6$–C$_{20}$ metal aryl, C$_1$–C$_{20}$ metal alkyl or aryl wherein the metal is halosubstituted, and mixtures thereof, wherein said metal is selected from the group consisting of Group 1 and 2 metals of the Periodic table and mixtures thereof, to generate nucleophilic oxygen sites on said support;

(B) treating a support produced in accordance with step (A) in the presence of said reagent with (i) a neutral, three coordinate metal component, MR$_3$, wherein M is selected from the group consisting of boron, tellurium, aluminum, gallium, indium and mixtures thereof and R, which may be the same or different, is selected from the group consisting of (a) halogen, (b) halosubstituted or unsubstituted, cyclic or non-cyclic, alkyl, alkoxy, alkenyl, and mixtures thereof, (c) halosubstituted or unsubstituted mono or multi-cyclic aryl, and (d) mixtures thereof, to chemically bond M directly to said nucleophilic oxygen sites of step (A) and thereby produce a four coordinate anion; and (ii) at least one organic compound represented by the formula R'X wherein R' has from 1 to 20 carbons and is selected from the group consisting of alkenyl, alkyl, aryl arylalkyl, and triphenylmethyl, and X is halogen, to form a Lewis acid cation counter ion to said anion, wherein said cation is effective to abstract an alkyl, aryl, or halogen group from a transition metal containing catalyst precursor to thereby form a cationic transition metal species.

6. The method according to claim 5, wherein the metal oxide support is selected from the group consisting of $SiO_2$, $Al_2O_3$, MgO, $ZrO_2$, $TiO_2$, $Fe_2O_3$, $B_2O_3$, CaO, ZnO, BaO, ThO, aluminum phosphate gel, and mixtures thereof;

the metal containing reagent of step A is selected from the group consisting of N-butyllithium, dibutylmagnesium, methyllithium, butylmagnesium chloride, and mixtures thereof;

the $MR_3$ of step B(i) is selected from the group consisting of tri(phenyl)boron, tri(p-tolyl)boron, tri(o-tolyl)boron, tri(pentafluorophenyl)boron, tri(o-p-dimethylphenyl)boron, tri(p-trifluoromethylphenyl)boron, tri(phenyl)aluminum, tri(p-tolyl)aluminum, tri(o-tolyl)aluminum, tri(pentafluorophenyl)aluminum, tri(o-p-dimethylphenyl)aluminum, tri(m,m-di(trifluoromethyl)phenyl)aluminum, tri(p-trifluoromethylphenyl)aluminum, and mixtures of the foregoing; and the organic compound of step B(ii) is chlorotriphenylmethane.

7. A method for preparing an activated catalyst composition which comprises contacting a catalyst support activator prepared in accordance with claim 5 with a transition metal compound selected from the group consisting of metallocene catalyst and Ziegler-Natta catalyst precursor, which catalyst and precursor contains a halo, alkyl, or aryl group, to abstract said halo, alkyl, or aryl group from the transition metal compound and thereby form cationic transition metal species therefrom.

* * * * *